US008138440B2

(12) United States Patent
Onufriyenko et al.

(10) Patent No.: US 8,138,440 B2
(45) Date of Patent: Mar. 20, 2012

(54) MEDIUM-VOLTAGE CIRCUIT-BREAKER

(75) Inventors: Yuriy Onufriyenko, Harkov (UA); Eduard Ulanovsky, Haifa (IL); Dov Yeger, Moshav Tal-Shahar (IL); Yefim Gofman, Ashdod (IL)

(73) Assignee: Arcoline Ltd., Ashkelon (IL)

( * ) Notice: Subject to any disclaimer, the term of this patent is extended or adjusted under 35 U.S.C. 154(b) by 76 days.

(21) Appl. No.: 12/438,422

(22) PCT Filed: Aug. 21, 2007

(86) PCT No.: PCT/IL2007/001037
§ 371 (c)(1),
(2), (4) Date: Feb. 23, 2009

(87) PCT Pub. No.: WO2008/023365
PCT Pub. Date: Feb. 28, 2008

(65) Prior Publication Data
US 2010/0006544 A1 Jan. 14, 2010

Related U.S. Application Data

(60) Provisional application No. 60/838,873, filed on Aug. 21, 2006.

(51) Int. Cl.
*H01H 3/00* (2006.01)
*H01H 33/34* (2006.01)
*H01H 75/00* (2006.01)
*H01H 67/02* (2006.01)
(52) U.S. Cl. ............ 218/154; 335/6; 335/131; 335/132; 335/42; 335/45; 335/90; 335/157; 335/193; 335/105; 335/126; 335/172; 335/174; 335/201; 335/202
(58) Field of Classification Search .................. 218/154; 335/6, 131–132, 42, 45, 90, 157, 193, 105, 335/126, 172–176, 201, 202
See application file for complete search history.

(56) References Cited

U.S. PATENT DOCUMENTS 2,150,566 A 3/1939 Scott, Jr.
3,013,563 A 9/1963 Grenier
(Continued)

FOREIGN PATENT DOCUMENTS

FR 1454452 4/1965
(Continued)

OTHER PUBLICATIONS

Tang et al., "Application of a Fault Current Limiter to Minimize Distributed Generation Impact on Coordinated Relay Protection," Paper No. IPST05-158 presented at the International Conference on Power Systems Transients (IPST'05) in Montreal, Canada on Jun. 19-23, 2005; and CIRGE data: Report No. 239 of Dec. 2003 of Working Group A3.10 on Fault Current Limiters in Electrical Medium and High Voltage Systems (also in specification and PCT).

(Continued)

*Primary Examiner* — Mohamad Musleh
(74) *Attorney, Agent, or Firm* — Oliff & Berridge PLC

(57) ABSTRACT

A fast acting switching mechanism for a circuit breaker includes a drive rod articulated to a drive module and supporting at an end thereof a contact bridge having at opposite ends thereof respective moveable contacts for switchably engaging a pair of fixed contacts of the circuit breaker. A contact spring unit is operatively coupled to the drive module for applying closing pressure in the order of 200 Kg; and a latch latches the drive rod in an open or closed position after operation of the circuit breaker and prevents rebounds. The contact bridge includes a pair of side conductors supporting on upper edges thereof an armature having an exposed upper surface that supports the moveable contacts at opposite ends of the armature; and a reinforcing element inserted between the side conductors.

23 Claims, 15 Drawing Sheets

U.S. PATENT DOCUMENTS

| | | | | |
|---|---|---|---|---|
| 3,103,563 A | * | 9/1963 | Grenier | 335/145 |
| 3,441,800 A | * | 4/1969 | Lee | 361/5 |
| 3,575,680 A | * | 4/1971 | Beaudoin et al. | 335/201 |
| 5,770,828 A | | 6/1998 | Niemeyer | |
| 5,808,257 A | | 9/1998 | Thuries | |
| 6,046,423 A | * | 4/2000 | Kishida et al. | 218/154 |
| 6,532,140 B1 | | 3/2003 | McMahon et al. | |
| 6,624,374 B2 | * | 9/2003 | Koyama et al. | 218/154 |
| 6,625,551 B1 | | 9/2003 | Gies et al. | |
| 7,035,066 B2 | | 4/2006 | McMahon et al. | |
| 2001/0030173 A1 | * | 10/2001 | Ulanovsky | 218/22 |

FOREIGN PATENT DOCUMENTS

| | | | |
|---|---|---|---|
| GB | 708293 | | 5/1954 |
| JP | 05062581 A | * | 3/1993 |
| RU | 2 233 525 C2 | | 7/2004 |
| WO | WO 01/95452 A1 | | 12/2001 |

OTHER PUBLICATIONS

Electrical Control Devices, pp. 430-431, "Vyshaya Shkola" Publishing House, Moscow, 1969 (also cited in the specification and PCT).

Steurer et al., "A Novel Hybrid Current-Limiting Circuit Breaker for Medium Voltage: Principle and Test Results," IEEE Transactions on Power Delivery, vol. 18, No. 2, Apr. 2003.

Gruning, "IGCT Technology-A Quantum Leap for High-power Converters," (5 pages).

CIRGRE Working Group 13.10, Fault Current Limiters Report on the Activities of CIGRE WG 13.10, pp. 137-145.

Onufryenko et al., Provisional Application No. 60/838,873, filed Aug. 26, 2006.

Jan. 16, 2008 International Search Report and Written Opinion issued in Application No. PCT/IL2007/001037.

* cited by examiner

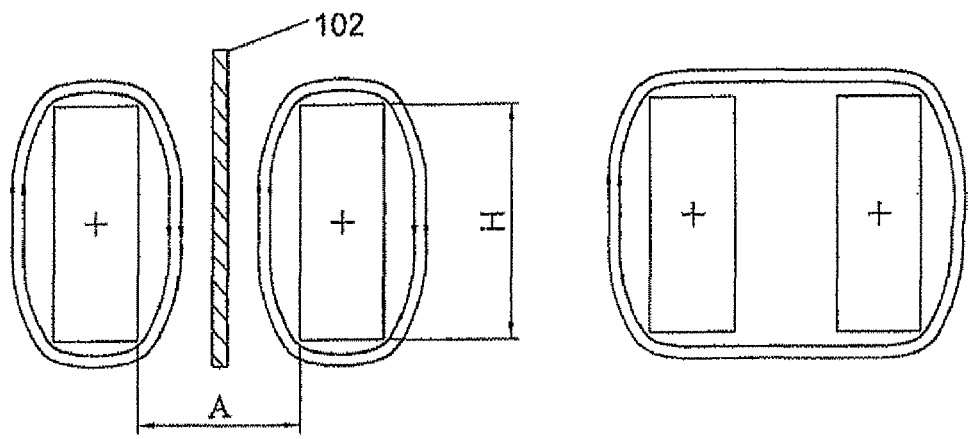
Fig. 7
Fig. 8
(Prior Art)
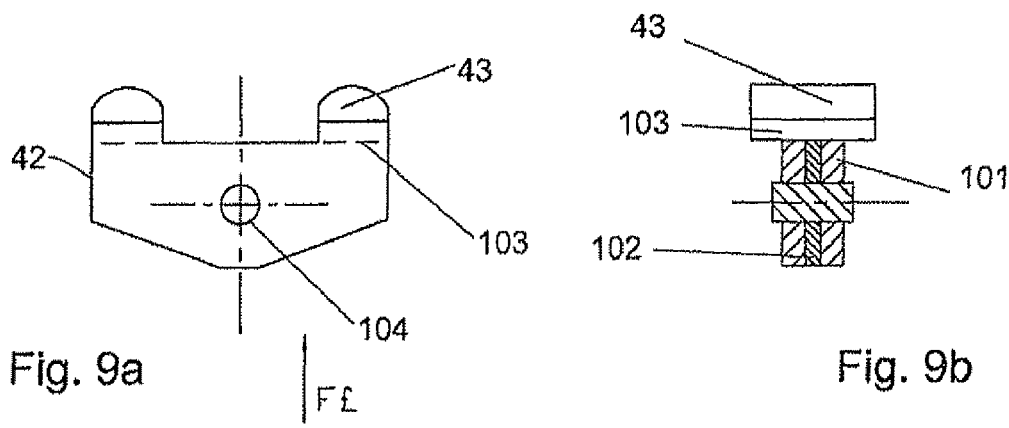
Fig. 9a
Fig. 9b
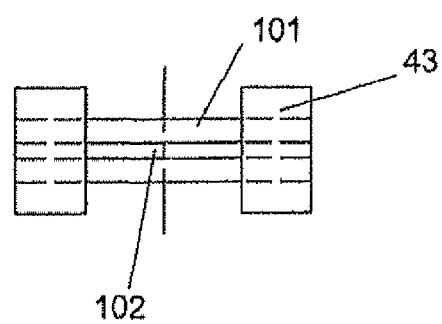
Fig. 9c

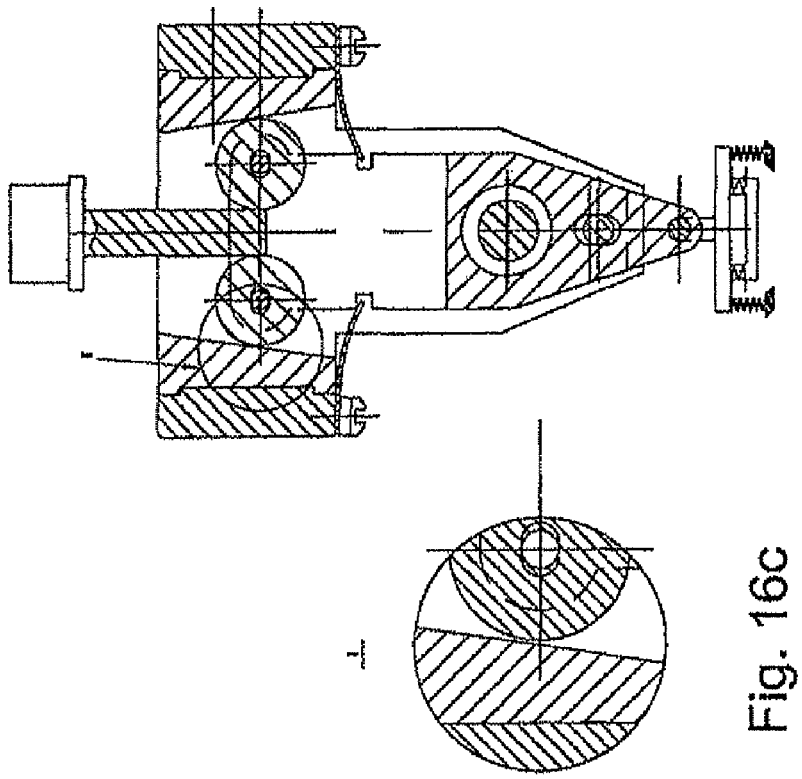
Fig. 16b
Fig. 16c
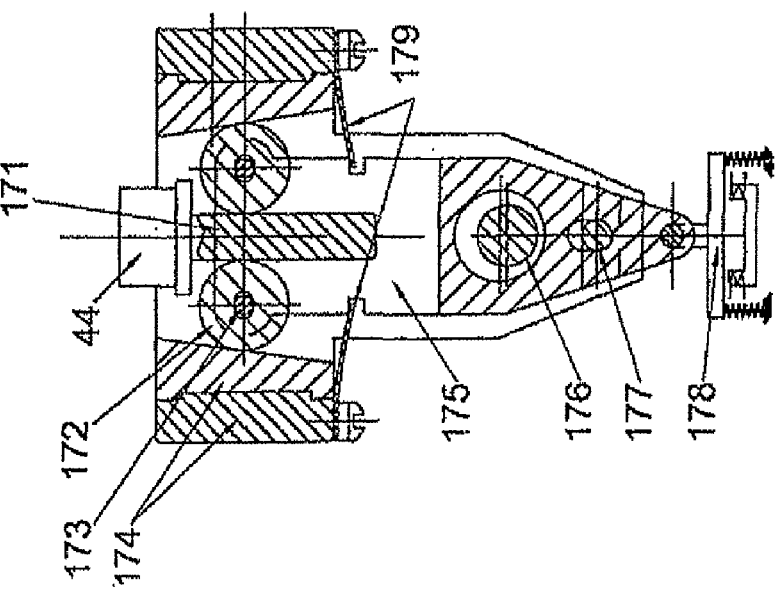
Fig. 16a

MEDIUM-VOLTAGE CIRCUIT-BREAKER

FIELD OF THE INVENTION

This invention relates to current limiting medium-voltage circuit-breakers.

BACKGROUND OF THE INVENTION

Faults in electric power systems are inevitable. Apart from the damages in the vicinity of the fault, owing to the effects of an electric arc, the fault currents (which are also referred to as "short-circuit currents") can damage equipment, such as overhead lines, cables, transformers and switchgear. A fault current breaker can limit or switch of a fault current.

A conventional AC fault current circuit breaker includes movable and static contacts. After a switch opening command is given, movable switch contacts move apart, thus creating an electric arc between the movable and static contacts. At a zero crossing point of the current, the arc extinguishes. It will not ignite provided that the insulation distance between the contacts is large enough to rule out. any breakdown of the dielectric between the contacts. If this distance is too small, the arc reignites, i.e., arcing duration in these switches is a function of insulation distance in the arcing area, breaking current value, and tripping time. The arc will continue until the zero crossing point. A majority of known switches are free from any short-circuit current restrictions. However, network-released heat and erosion of contact material during arcing will depend on the current and arcing duration. Arcing duration can be long enough (5 milliseconds as an average). Maximum current value can reach $I_{max}=1.8\cdot\sqrt{2}\cdot I_{nominal}$ where $I_{nominal}$ is nominal rated current. This results in an intensive erosion of contact material, and consequently, in a shorter service life of the device and, what is most important, in a smaller number of fault trips. These are the main drawbacks of the device.

Also known in the art is a current limiting switch, also referred to as a "fault current limiter", which is an electric device that not only commutes rated and overload currents but also breaks fault currents flowing in the protected circuit. Using current limiting switches in existing networks can avoid replacement of the existing network equipment and lines.

A major requirement of current limiting switches is a multiple limitation of an absolute value of fault current in the protected networks. To obtain the operational specifications required, current limiting time must be as short as possible (preferably, $t_{lim}$<0.8 ms). When power is delivered to the load from the power source (e.g., transformer), the mechanical strength of network wires is tailored both for rated current and fault current. When power consumption increases during the course of natural progress and development thus requiring additional transformers and generators, fault currents increase thus demanding a higher electrodynamic stability of the network and possibly upgrading of lines and equipment.

Various types of fault current limiters, such as passive limiters, solid state limiters and the hybrid fault current limiter are known in the art (see, for example, G. Tang and M. R. Iravani, Paper No. IPST05-158 presented at the International Conference on Power Systems Transients (IPST'05) in Montreal, Canada on Jun. 19-23, 2005; and CIRGE data: Report No. 239 of December 2003 of Working Group A3.10 on "Fault Current Limiters in Electrical Medium and High Voltage Systems"). FIG. 1 shows a circuit diagram of a hybrid fault current limiter including an ultra-fast transfer switch S1 connected in parallel with a load switch that is connected in series with a low-inductive non-linear resistor having a positive temperature coefficient (PCT). Also connected across the transfer switch is a fast-acting disconnector coupled in series with a thyristor bridge that may based, for example, on Gate-Turn-Off (GTO) thyristor or an integrated gate commutated (GCT) thyristor). The three switches are mechanical and during steady state operation of the system, all three switches are closed and the GTO thyristor in the bridge is gated on. When a fault occurs, the ultra-fast mechanical transfer switch opens within several hundred microseconds, and commutates the still rising current into the commutation path, constituted by the disconnector in series with the semiconductor discharge electronic switch. The semiconductor discharge electronic switch provides a time delay for the transfer switch to recover to a certain withstand voltage and is switched off subsequently, forcing the current into the limiting path, constituted by the non-linear resistor. Before this resistor is heated up significantly, thus limiting the current, the disconnector is opened so that the semiconductors are isolated from the continuing rising voltage. Finally, the load switch having an opening time of less than half a cycle interrupts the fault current at its first zero crossing. The time delay between detection of the fault and the limitation of the current can be less than 1 millisecond.

Drawbacks of the hybrid fault current limiter are related to kinematic complexity, high price of the components, relatively low nominal voltage (usually, up to 15 kV), and inoperative nature of the device.

Also known in the art is a synchronous switch (see, for example, Electric control devices, pp. 430, 431, "Vyshaya Shkola" Publishing House, Moscow, 1969), which is an electrical device that commutes rated currents, overload currents, and fault currents flowing in the protected circuit. By using such a device, currents flowing in the protected circuit are interrupted close to zero crossing point (e.g.<1 milliseconds).

SUMMARY OF THE INVENTION

According to one aspect of the present invention, there is provided a fast acting switching mechanism for a circuit breaker, said fast acting switching mechanism comprising:

a drive rod articulated to a drive module and supporting at an end thereof a contact bridge having at opposite ends thereof respective moveable contacts for switchably engaging a pair of fixed contacts of the circuit breaker;

a contact spring unit operatively coupled to the drive module for applying a total closing pressure in an order of 200 Kg; and a latch for latching the drive rod in an open or closed position after operation of the circuit breaker and preventing rebounds;

wherein the contact bridge includes:
  a pair of side conductors supporting on upper edges thereof an armature having an exposed upper surface that supports said moveable contacts at opposite ends of the armature; and
  a reinforcing element inserted between the side conductors;
  such that when current flows through the contact bridge corresponding magnetic fluxes generated by the side elements cancel each other in an area between the side elements whereby substantially no magnetic flux passes through the reinforcing element.

According to another aspect of the invention, there is provided a low cost medium-voltage circuit-breaker having a fast acting switching mechanism. In one embodiment the circuit-breaker operates as a current limiting switch for breaking both operating and fault currents to provide a multiple restriction of the absolute value of short-circuit (fault) current. In another embodiment, the circuit-breaker operates as a synchronous switch. Within the context of the present application and the appended claims, the term "medium-voltage" includes voltages in the range of about 1 to 55 kV.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 7 shows operating magnetic fluxes surrounding two proximate flat parallel buses;

FIG. 8 shows total magnetic field around the buses shown in FIG. 7;

FIGS. 9a, 9b and 9c show schematically a heavy-current bridging contact with internal high-strength reinforcement, according to an embodiment of the invention;

FIG. 16a, 16b and 16c show details of a latch according to an embodiment of the invention;

DETAILED DESCRIPTION OF EMBODIMENTS

Figure 1:
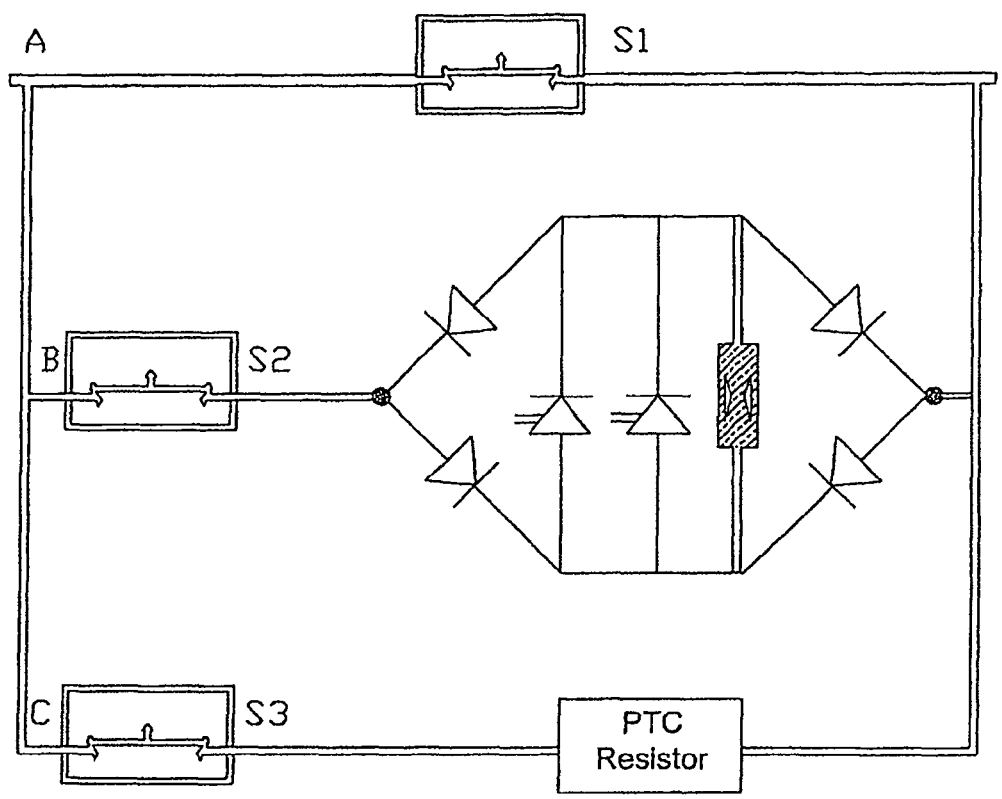
FIG. 1 is a circuit diagram of a known Hybrid Fault Current Limiter.
Figure 2:
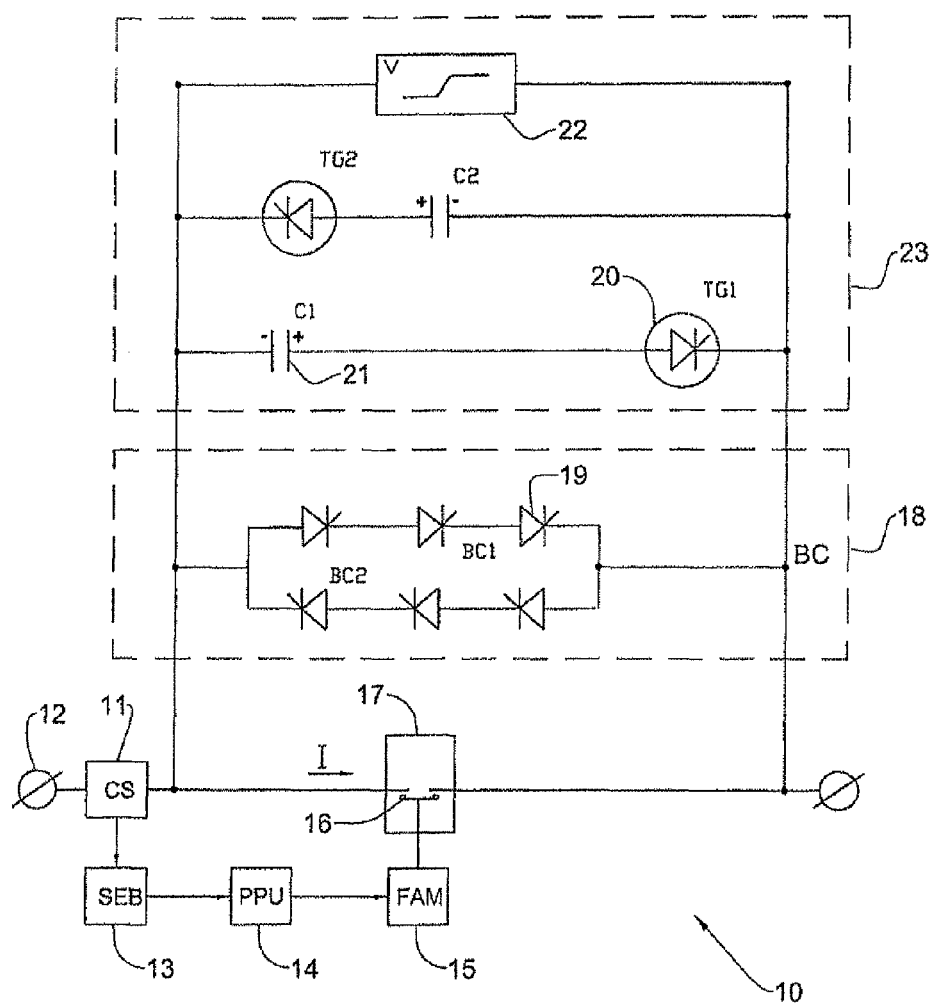
FIG. 2 is a schematic diagram of circuit-breaker for one phase, according to a current limiting embodiment of the invention.

FIG. 2 is a circuit diagram showing one pole 10 of a multi-phrase circuit breaker according to an embodiment of the invention. Generally, an n-pole medium-voltage AC circuit-breaker has "n" identical independent switches, i.e. one for each phase. For example, a three-pole switch includes three equal independent phases. A current sensor 11 (CS) is connected in the AC line 12 for measuring the AC line current and feeding a signal indicative thereof to a sensor electronic board (SEB) 13. The SEB analyses the (CS) signal for fault conditions detection and in case of a fault provides a trigger signal to a pulse power unit (PPU) 14 for operating a fast acting switching mechanism (FAM) 15 that opens contacts 16 of a contactor 17 connected in the AC line. The SEB 13 also feeds the trigger signal to a thyristor bridge 18 that is coupled across the contactor 17 and that comprises two parallel branches BC1 and BC2 each having multiple series-connected thyristors 19, the thyristors in each branch being of opposite polarities so that during one half cycle of the AC voltage current flows through one branch and during the other AC half cycle current flows through the other branch. Also connected across the contactor 17 are two parallel branches each containing an semiconductor discharge electronic switch 20 connected in series with a respective commuting capacitor 21 (also shown as C1 and C2), such that the semiconductor discharge electronic switches 20 in each branch are of opposite polarities so that during one half cycle of the AC voltage current flows through one branch and during the other AC half cycle current flows through the other branch. Finally, a plurality of varistors 22 is connected across the contactor 17. The semiconductor discharge electronic switches 20, the commuting capacitors 21 and the varistors 22 together form a current and over-voltage limiting power unit 23.

Having described the topology of the circuit breaker, its operation will now be described. A signal of current i(t) from the current sensor 11 is supplied to the SEB 13. The SEB provides indications of values of current changes di/dt and the current i(t) which are monitored during a short period of time (that is adjustable), and compared to references to detect a fault current and avoid a fault detection. In case of a fault current detection the SEB 13 triggers the Pulse Power Unit 14 which operates the switching mechanism 15FAM, to open the contacts 16 of the contactor 17, whose movable main contacts will move apart from the fixed ones, when forced by the fast acting switching mechanism 15. Once this happens, the thyristors 19 in one (but not both) of the branches will open depending on current direction, with current transmitting from the contact device to respective branch thyristors in the bypass circuit (BC).

The semiconductor discharge electronic switch 20 in one of the branches of the power unit 23 will be opened in the respective branch, depending on current direction in the network, and the respective commuting capacitor C1 or C2 starts discharging in counter direction to the flow of the breaking circuit current (fault current).

Capacitor discharge current is slightly higher than short-circuit current. Since the loop self-resonant frequency of the "commuting capacitor—bypass circuit" is measured in KHz, discharge current will oppose and reach short-circuit current value within fractions of milliseconds. To ensure that the thyristors lock, the capacitor discharge-to-zero time will be assumed $\geq 0.1$ s (which is required to lock bypass circuit thyristors). Then, the capacitor 21 starts recharging, with current flowing through until the capacitor voltage reaches the network voltage. At this point, also known as the current-limiting point, fault current flowing through the switch stops growing, and drops to zero. From this point on, current stops flowing through the capacitor, while the breaking current will flow through the varistors until being reduced to zero.

Figure 3:
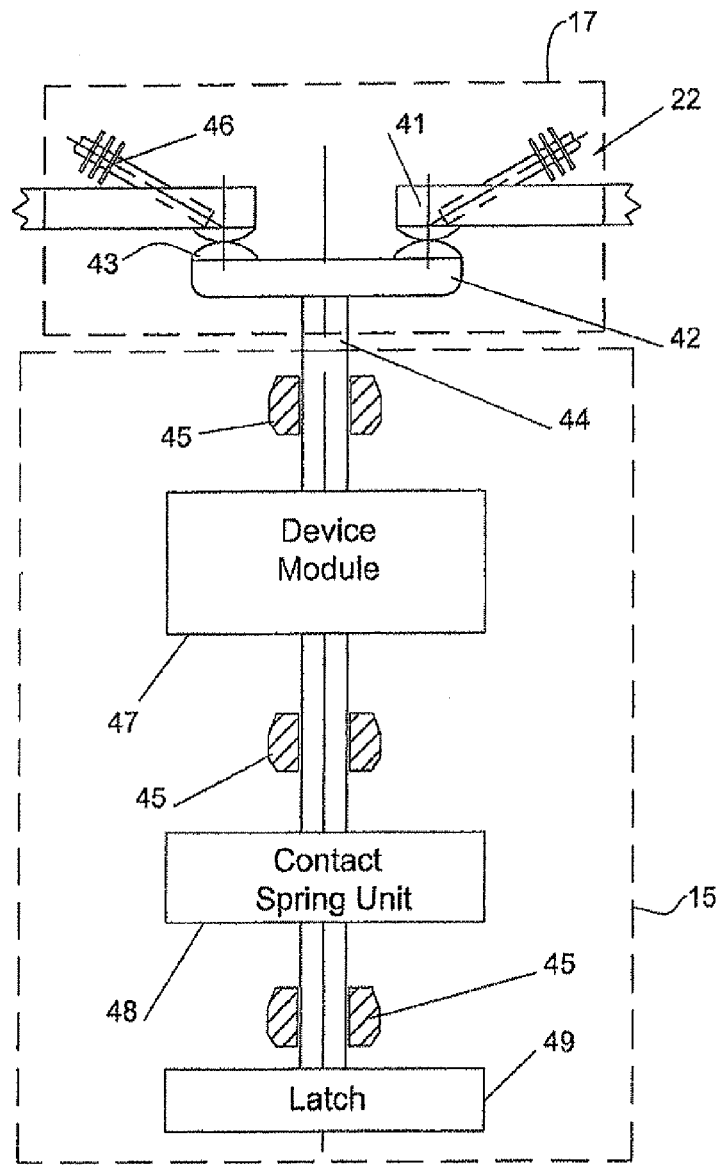
FIG. 3 shows a functional schematic diagram of the contact device and a fast acting switching mechanism shown in FIG. 2, according to an embodiment of the invention.

FIG. 3 shows schematically the contactor 17 in conjunction with the fast acting mechanism 15, according to an embodiment of the present invention. This embodiment is suitable for use in both a current-limiting circuit breaker and a synchronous switch. The contactor includes a pair of fixed contacts 41 that are connected via supply terminals to the AC line and a moveable contact bridge 42 that supports contacts 43 at opposing ends thereof and may be moved by the switching mechanism 15 toward or away from the fixed contacts 41 so as to make or break contact with the fixed contacts 41. The figure shows the contacts 41 and 43 in the closed position of the switch. The contact bridge 42 is fixed to a moveable drive rod 44 formed of a heavy-duty insulation material that is slidably supported within guides 45. Heat pipes 46 formed of thermally conducting closed tubes containing a refrigerant under low pressure and supporting radiation fins are disposed proximate the respective junctions of the fixed contacts 41 and the moveable contacts 43. Heat from the contacts is absorbed by the refrigerant, which boils and evaporates, thus rising up the heat tube where it re-condenses and falls back. Such heat pipes thus provide a continuous cyclic mechanism for conducting heat caused by contact switching away from the contacts.

The fast acting switching mechanism 15 includes a drive module 47 configured to generate a traction (pulling) force (Fδ), a contact spring unit 48 for creating contact pressure in the order of 200 Kg (i.e. 100 Kg/contact) and a latch 49 for latching the switch in the OFF position. The cross-section of the drive rod 44 (e.g. with insulation ribs) and its distance between the contact bridge 42 and the fast acting drive module 47 are designed with sufficient clearance to ensure grounding of the fast acting drive components. The contact device is constructed to meet the following major requirements:
1. Minimal movable contact mass, i.e., the admissible current density $J=I/S$ (A/mm$^2$) of the contact should be as high as possible.
2. The contact bridge 42 should possess sufficient mechanical strength to ensure the required performance of heavy-current high-speed switch.

To meet the first requirement, the heat pipe 46 may be installed at the fixed contacts 41 as close as possible to the contact points, in order to extract heat from these points (i.e., to increase the admissible current density J of the movable contact). For example, it has been found that while extracting heat from the contact points by means of fixed contact heat pipes where $J=40$ A/mm$^2$ and the contact pressure produced by the spring module is $F_{ct}=2,000N$, in an SF$_6$-filled high-speed current limiting switch at Vh=24 kV, $I_h$=2,500A the contact bridge 42 together with the contacts 43 must have a combined mass of 30 g. With no heat pipes installed at the fixed contacts, the current density will be $J \leq 5$ A/mm$^2$ corresponding to the current density of known switches, and the movable contact mass in this case will never be less than 240 g, which requires a considerably higher drive power, mass and price.

To meet the second requirement, the contact bridge 42 must have a minimum admissible mass at the required mechanical strength.

To prevent welding of the contacts 41 and 43, the contact pressure $F_{ct}$ of the heavy-current switches ($I_h$=1,600A-2,500A) must reach thousands Newton. In this case, total rod pressure $F_\Sigma$ on the bridge doubles, since $F_\Sigma=2 F_{ct}$.

Figure 4:
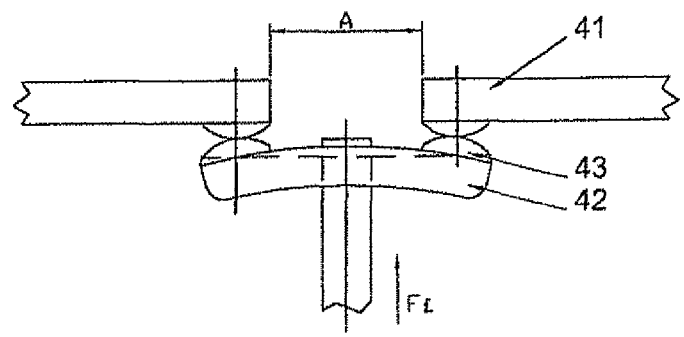
FIG. 4 shows a detail of the main circuit-breaker contacts when closed.

FIG. 4 shows a detail of the contacts when closed. The fixed contacts 41 have a mutual separation A, which determines the effective length of the contact bridge 42 and is dictated by the rated voltage of the switch and the dielectric medium (air, SF$_6$ gas, etc.). The movable contact mass may be considered to comprise essentially the contact bridge 42 since to a first approximation, the soldered mass of the contacts 43 can be ignored. To decrease the mass of the contact bridge 42, its cross-section and effective length A should be as small as possible. The value of the effective length A cannot be reduced for a circuit breaker of given rating and dielectric. A several-fold reduction of the bridge cross-section is not a problem, since copper is a good current conductor, and there will be no bridge overheat when applying the rated current. Copper, however, features poor mechanical properties, and therefore at a several-fold reduction of the bridge cross-section, the bridge sags under the application of a large drive force $F_\Sigma$ as shown in the figure.

Figure 5:
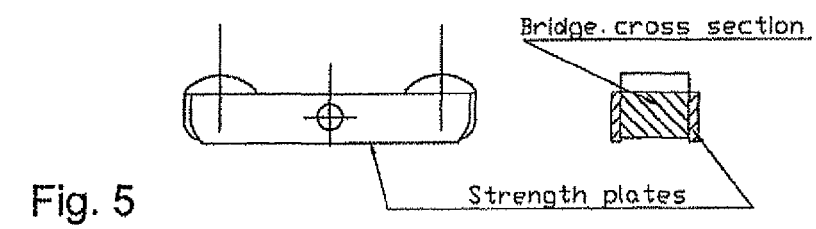
FIGS. 5 and 6 show schematically examples of how the mechanical strength of the contacts bridge may be reinforced.
Figure 6:
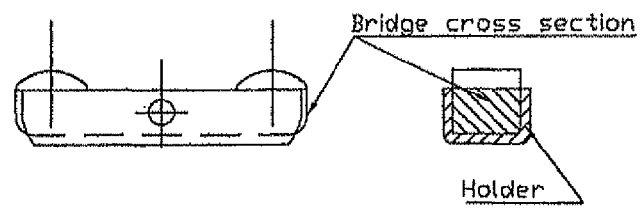

Prior attempts to improve the mechanical strength of copper contacts by reinforcing the bridge material-made ribs have met with no success. Basically, the mechanical strength of the contact bridge can be improved by attaching plates of high-strength material (such as steel) on its side surfaces as shown in FIG. 5 or by placing the bridge into a holder, which can be made of steel, for example, as shown in FIG. 6. However, high-strength magnetic materials such as steel and non-magnetic conductors such as stainless steel or titanium in AC circuits rated at more than 1kA will be heated by the variable magnetic field caused by eddy currents flowing through the junction between the disparate materials. Such heat militates against reducing the bridge cross-section in order to reduce its mass.

Known contact design is based on the assumption that the magnetic fluxes between two flat parallel buses of the same size are almost entirely canceled, provided that the currents flowing in the buses have the same value and direction, while the bus height H is much larger than the distance A between them as shown in FIG. 7. Therefore, the combined magnetic field will be as shown in FIG. 8. It should be noted that the element 102 shown in FIG. 7 relates to the contact bridge according to the invention and not to the prior art. The significance of this will become apparent from the following description.

FIGS. 9a, 9b and 9c are orthogonal views showing a detail of the contact bridge 42 according to an embodiment of the invention. This embodiment is suitable for use in both a current-limiting circuit breaker and a synchronous switch. The contact bridge 42 comprises a pair of flat parallel side conductors 101 whose upper edges support an armature 103 at opposite ends of which the respective contacts 43 are soldered. A reinforcing element 102 formed, for example, of a magnetic material such as steel or titanium is inserted between the side conductors 101 the resulting sandwich structure being secured by a pin 104. Such an arrangement allows force transfer $F_\Sigma$ from the rod to the soldered contacts by means of the high-strength reinforcing element 102, and the mechanically poor conducting parts of the bridge (copper buses) are therefore relieved from mechanical load. Such an arrangement exploits the fact that the net magnetic field in the space between the side conductors 101 is zero for the reasons explained above with reference to FIG. 8. This means that there is no magnetic field through the reinforcing element 102, which as shown in FIG. 7 is located in the area between the side elements where the net magnetic flux is zero.

It emerges from the foregoing description that the main differences between the contact device according to the present invention and those known in the art are as follows:
1. A heavy-current high-speed AC bridging contact with current-carrying elements made of conducting materials and reinforcing elements of heavy-duty materials, including magnetic conductors, having reinforcing elements located between current-carrying elements in areas where magnetic fields of separate current-carrying elements are almost entirely canceled.
2. A heavy-current high-speed AC bridging contact as above, wherein current-carrying elements are made as two parallel flat buses of the same size with soldered contacts on the edges, and the reinforcing element is a high-strength magnetic conductor plate (steel) or a non-magnetic current conductor (titanium) placed between current-carrying elements.

3. Heat pipes are installed at fixed contacts as close as possible to the contact points, in order to extract heat from these points thus allowing the admissible current density J in the movable contact bridge 42 to be increased.

The switching mechanism (FAM) 15 should meet the following requirements:

1. Drive opening time $t_{op}$ (i.e., the time from switch-off command to the starting moment of switch contacts release) should be as short as possible ($\leqq 0.1$ ms).
2. Contact traveling time $t_\delta$ from the starting of contacts release to attain a clearance $\delta$, as necessary to ensure a reliable commutation, should be as short as possible ($\leqq 0.5$ ms).
3. As soon as the contacts reach a clearance $\delta$ during opening of the switch, shock-free braking should follow to avoid tripping rebound and re-bridging of contacts.
4. When the contacts are ruptured, they should be reliably fixed.
5. Contact pressure $F_{ct}$, as exerted by the movable contact bridge 42 against the fixed contacts 41, should be consistent with rated current, breaking capacity, and protective properties of the switch.
6. No rebounds are permitted when closing the contacts.
7. When in operation, the power consumption of the switching mechanism 15 should be as low as possible.
8. FAM should allow multiple operation and automatic re-closing.
9. FAM should not be exposed to the high voltages of the protected network.
10. FAM should allow switching on of the switch, even if there is a short-circuit current in the network Requirement 1 calls for a failure-free and basically slack-free FAM kinetic system.

Requirement 2 calls for creating a predetermined force Ft by the drive system. An average Ft can be determined by the known formula:

$$F = \frac{2\,m\delta}{t^2}$$

For example, for a switch contact device housing, with $SF_6$ gas at 5 atm. pressure (Vn=24 kV), In=2,500 A) at $t=t_\delta=0.5*10^{-3}$ s, clearance $\delta=5*10^{-3}$ m (as required in terms of insulation properties), and minimal mass of movable parts $M=M_\Sigma=0.2$ kg, the average Ft is given by:

$$F = \frac{2 \times 0.2 \times 5 \times 10^{-3}}{(0.5 \times 10^{-3})^2} = 8{,}000 \text{ N}$$

Taking into consideration the value of Ft, requirement 3 calls for shock-free braking only, or otherwise rebounds will occur. Moreover, this will make requirement 8 more difficult to attain. Meeting the other requirements will depend on general technical requirements to high-voltage and high-current devices, as set forth in respective standards. The drive module 47 is designed to create tractive force Ft along the working travel and is an important feature of the invention.

An electrodynamic device (EDD), which is widely-used in power electric equipment to create Ft and working travel based on conductor-current interaction, can serve as a basic structure. It should be noted that large values of Ft, $\delta$, and mass require a higher material strength of the movable parts of the EDD, which in turn demands that Ft be as constant as possible, i.e., $Ft=F_{av}\sim$Const (in this case, $F_{max}$ will be of minimal value). Known EDDs, however, are not fully capable of meeting these requirements.

Figure 10:
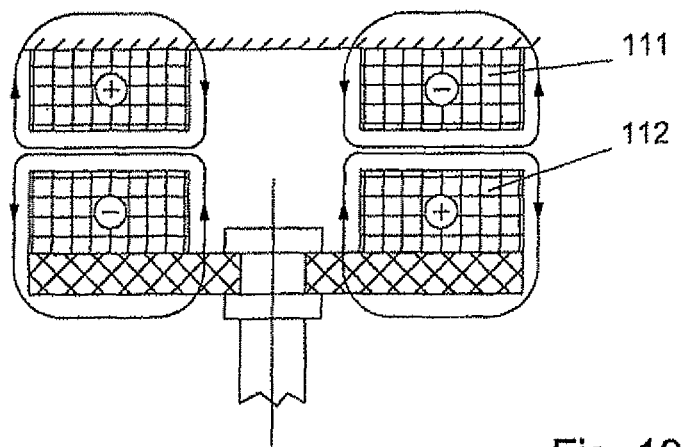
FIG. 10 shows a known electrodynamic device (EDD)

FIG. 10 shows schematically a known EDD comprising a first coil 111 and a second coil 112 that form part of respective electromagnets that provide a falling F$\delta$ characteristic in that current flowing through the two coils in the direction shown by the arrows, produces a mutually repulsive magnetic field that reduces the impact as the two coils meet during closure of the switch. Such an EDD is not self-braking when the contacts are separated during opening of the switch and requires a separate device to brake the movable mass. A major drawback of classic EDDs is that their tractive force is created at a high di/dt in the coil winding, i.e., they basically operate at the peak pulse rise alone and therefore have a low efficiency factor.

Figure 11:
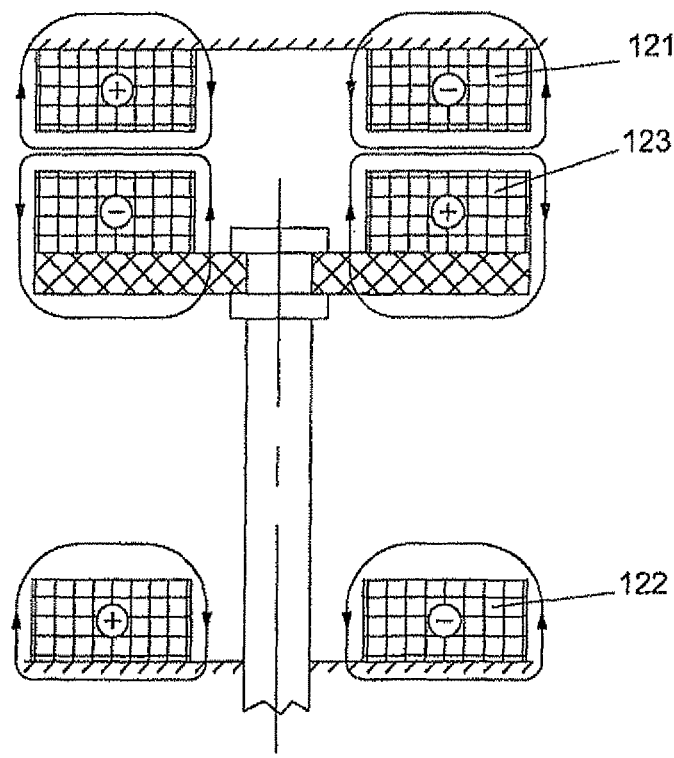
FIG. 11 shows a known three-coil EDD.

FIG. 11 shows schematically a known three-coil EDD having two fixed coils 121, 122 and a movable coil 123 between them. Though capable of operating during almost the entire current pulse (which increases the performance factor) and possessing a self-braking feature, they also have a falling F$\delta$ characteristic. It should be noted that a three-coil EDD can have approximately constant Ft, provided that its fixed coil 121 repels the moving coil 123, while the fixed coil 122 attracts the moving coil 123 at an appropriate current polarity in the coils. However, this substantially rules out self-braking, because it requires reversing the current direction at least in the coil 122 so that instead of attracting the moving coil 123 it now repels it. This is difficult owing to the inductance of the coil 122 which opposes a sudden change in current and the need to effect the desired current reversal in a very narrow time frame while the movable coil 123 is still traveling. Such known devices therefore cannot be used in high-voltage fast-acting current limiting switches employing a fail-free direct kinematic drive that does not require a rapid trip mechanism when closed during a short-circuit fault.

In contrast, the fast acting switch mechanism 15 according to the invention does not require a rapid trip mechanism when closed during a short-circuit fault. According to an embodiment of the invention, the fast acting switch mechanism 15 operates as follows. When the switch is closed as shown in FIG. 3, the required contact pressure $F_{ct}$ of the contact bridge 42 against the fixed contacts 41 is formed by the contact spring unit 48. The contact spring unit maintains the contact bridge in the closed position. When the switch opens, the drive module 47 applies a tractive force Ft to propel the contact bridge 42 away from fixed contacts 41. Since Ft>>Fct, the contact spring unit 48 will not prevent tripping the contact bridge 42 and therefore no rapid trip mechanism is required to disconnect the contact spring unit 48 from the drive rod 44 during traction of the drive rod, as is necessary in hitherto-proposed devices.

After the contact bridge 42 is moved away to the required distance $\delta$, it is maintained in the open position by the latch 49. The switch mechanism 15 remains in this position all the time, while the switch is open. In order to close the switch, the latch 49 releases the drive rod 44, which starts moving under the influence of the contact spring unit 48 following which the fixed contacts 41 are bridged by the contact unit 42 thus completing the circuit, and the movable parts of the drive module 47 are set to the "start" position. This way, the drive module 47 is kinematically transferred to the ready-to-open position. If the switch is closed during a short-circuit current condition, the current sensor 11 triggers the drive module 47. Since the tractive forces Ft created by the drive module 47 are much larger than the spring force, $F_{cr}$, generated by the contact spring unit 48, the switch is opened and short-circuit current thus interrupted. No trip-free release is required.

Figure 12:
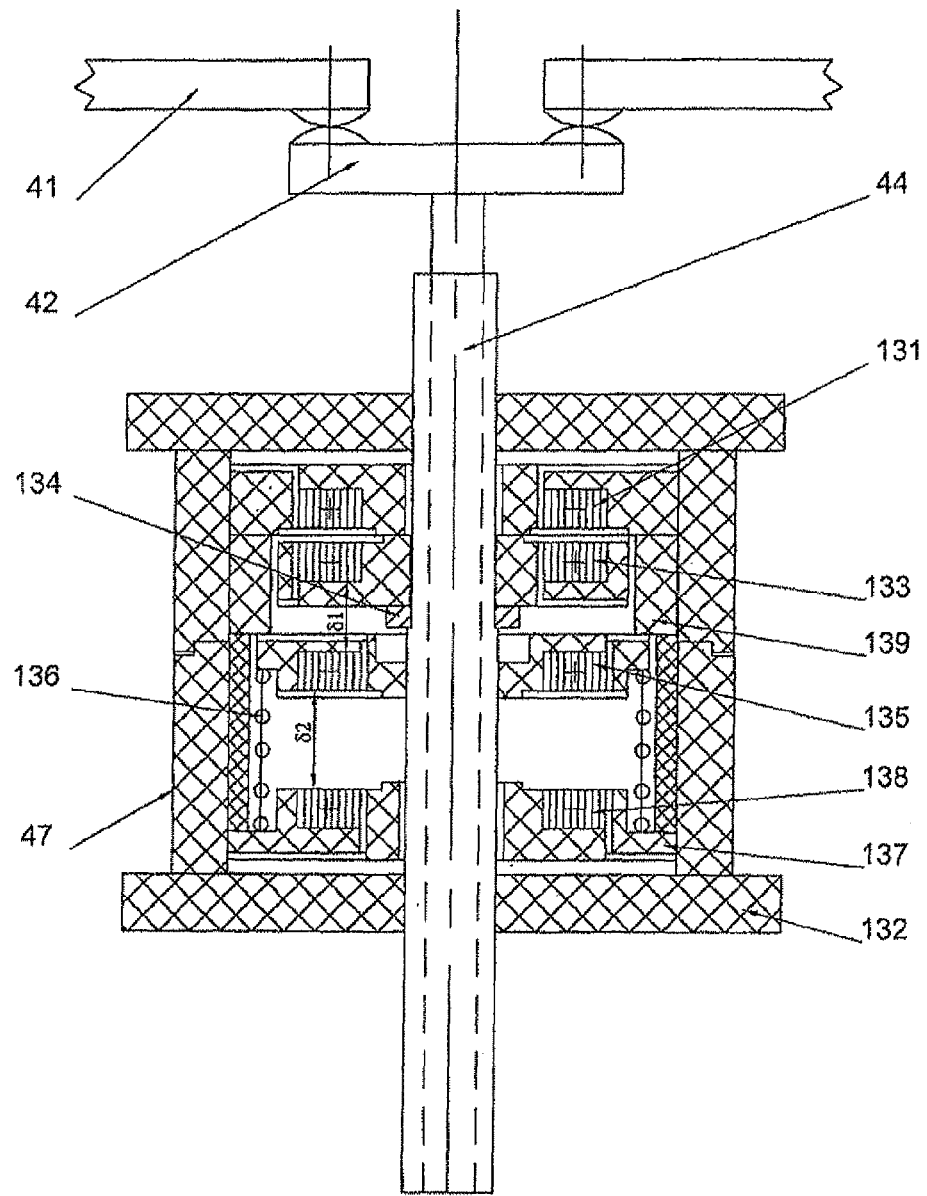
FIG. 12 shows a detail of a drive module used in the switching mechanism according to an embodiment of the invention.

FIG. 12 shows a detail of a drive module 47 having a repulsion coil 131 fixed in a housing 132 which is fixedly mounted within the circuit breaker so that when the drive rod 44 moves within the housing 132 the contact bridge 42 supported by the drive rod moves relative to the fixed contacts 41. An actuation coil 133 is supported on a pivot ring 134 that is adapted to engage the drive rod 44, thus inducing movement of the drive rod 44 when the actuation coil 133 moves within the housing. An acceleration coil 135 is slidably mounted on the drive rod 44 for moving relative thereto when the switch closed and is initially retained against an annular collar 137 (constituting a retention device) of the housing 132 by a light spring 136. A braking coil 138 is fixed against a base of the housing 132. and an annular collar 139 serves as a spacer that maintains a minimal clearance between the actuation coil 133 and the acceleration coil 135.

The drive module 47 operates as follows. Under normal i.e. non-fault conditions as shown in FIG. 12, the switch formed by contacts 41, 43 is closed under the action of the contact spring unit 48, no power is fed to the drive module 47, the actuation coil 133 is located near repulsion coil 131 and the acceleration coil 135 is pushed by the spring 136 into an initial uppermost position. There still remains a slight clearance (e.g., 0.5 mm) between the coils dictated by manufacturing and design tolerances. In the closed position shown in FIG. 12, the acceleration coil 135 rests against the spacer formed by the annular collar 139 in the housing 132, thus separating the coils 133 and 135 by a "speeding clearance" δ1. Coils 135 and 138 are separated by a "braking clearance" δ2, which is larger than δ1 e.g., by a factor of two. To open the switch, a current pulse Ipulse is applied simultaneously to the repulsion coil 131, the actuation coil 133 and the acceleration coil 135. Current polarities in the coils 133 and 135 are arranged so that, during opening of the switch, the actuation coil 133 is repelled away from the fixed repulsion coil 131 and attracted toward the acceleration coil 135. The drive rod 44 is not of uniform diameter but rather has a slightly narrower upper portion defining a peripheral ridge which engages the pivot ring 134 when the circuit breaker is closed (as shown in FIG. 12). In this condition, downward movement of the pivot ring 134 and attached coil 133 within the housing 132 pushes the drive rod 44 down relative to the housing thus separating the circuit breaker contacts 41 and 43. The propulsion force exerted by the repulsion coil 131 against the actuation coil 133 is reduced, as long as the clearance between them increases, almost proportionate to the clearance, while the force of attraction of the actuation coil 133 to the acceleration coil 135 increases almost in proportion to the clearance between the repulsion coil 131 and the actuation coil 133, provided that the clearance is far smaller than the average diameter of the windings of both coils.

If the ampère-windings of coils 131 and 135 are identical, the resulting traction force Ft, as applied to the actuation coil 133 can be assumed constant to a first approximation. Accordingly, during movement of the actuation coil 133 through the speeding clearance δ1, the actuation coil 133 resting on the peripheral ridge of the drive rod 44 pushes the drive rod 44 and hence the contact bridge 42 attached thereto with constant acceleration, which is required to ensure optimal operation of the drive module 47.

When the actuation coil 133 passes through the speeding clearance δ1, it engages the acceleration coil 135, and both start moving in tandem relative to the fixed housing 132 against the light force of the spring 136, which thus compresses. From now on, the actuation coil 133 stops accelerating thereby causing a rapid several-fold drop of traction force Ft, and speed. The effect exerted by the braking coil 138 creates a braking force, $F_{br}$ which acts on the coils 133 and 135. As a result, the movement of the coils 133 and 135, drive rod 44 and contact bridge 42 is slowed down. As coils 133 and 135 approach the breaking coil 138, the breaking force $F_{br}$ increases, while the speed of the movable components within the housing 132 drops even further. When the clearance between the abutting coils 133, 135 and the breaking coil 138 is smaller than that between the abutting coils 133, 135 and the repulsion coil 131, the breaking force $F_{br}$ considerably exceeds the traction force, Ft thus inducing deceleration of the abutting coils 133, 135 and hence of the drive rod 44. As a result, the speed of the movable components of the drive module 47 within the housing 132 and of the drive rod 44 falls sharply. This is facilitated by the growing compression of the contact spring unit 48 until at a certain point the speed of movable parts is reduced to zero, when the drive rod 44 comes to momentary rest. However, since $F_{br}$>>Ft, the movable parts of the drive rod now start moving in the upward direction towards fixed contacts 41. At this point, the latch 49 arrests the movable parts of the drive module 47, so as to maintain the contact bridge 42 in the open position separated from the fixed contacts 41. In order to reduce the time to open the switch, the braking coil 138 should be activated only when braking is required to start.

It thus emerges that distinctive features of the drive module 47 are as follows:
1. The actuation coil 133 is located between repulsion coil 131 and the acceleration coil 135 and creates a basically constant tractive force during acceleration owing to a basically constant magnetic field.
2. At the braking stage after the actuation coil 133 engages the acceleration coil 135 they conjointly approach the braking coil 138 thereby creating the braking effect.

The contact spring unit 48 may be a cassette-type low-inertia power spring that applies contact pressure to the contact bridge 42 during closure of the switch. In contrast, in typical prior art configurations, the spring mass in the switching mechanism 15 is comparable to the total mass of its remaining movable parts, sometimes even higher. This increases the inertia of the movable parts and militates against the development of a drive module having the required dynamic properties as achieved by the invention using springs of much lower inertia.

To provide a drive with required dynamic properties, heavy-duty power springs (F=1,000N-10,000 N) are used whose inertia is several times lower than that of the most widely used state-of-the-art coil helical cylinder springs. As is known, the inertia of a spring can be evaluated by means of a so called "dynamic ratio":

$$Kd = \frac{F_m \cdot f}{f_{cg} \cdot M_{st}} \left(\frac{N}{kg}\right)$$

where:
$F_m$ is an average force of the spring along its working travel;
f is spring working travel;
$M_{st}$ is spring static mass;
$f_{cg}$ is displacement of the center of gravity of the spring during working travel f.

The physical significance of Kd is that its numerator represents the work, as can be performed by the spring, while the denominator is a characteristic of spring inertia, being a product of the spring mass at the center of gravity and the displacement of this mass during working travel f. Therefore, the larger the absolute value of Kd, the smaller is the spring inertia.

As known, the ratio $$\frac{f}{f_{cg}}$$

exerts a prevailing effect on any spring inertia. For the sake of comparison, Table 1 shows the values of $f/f_{cg}$ and Kd at the same value of $F_m*f$ for various spring designs (i.e., identical spring work capabilities) including helical cylinder springs.

TABLE 1

| Spring design | $\frac{f}{f_{cg}}$ | Kd |
|---|---|---|
| Coil helical cylinder springs | 2 | 1 |
| Flat rectangular springs | 4 | 0.8 |
| Flat triangular springs | 8.3 | 4.3 |

As seen from Table 1, flat triangular springs are 4.3 times less inertial than helical cylinder springs and 5.4 times less inertial than flat rectangular springs. Therefore, flat triangular springs as shown schematically in FIGS. 13a and 13b should be used as a basic component of low-inertia power springs. It should be noted that the base of the triangle is fixed in the support, with a load f applied to the corner apex, perpendicularly to the plane of the spring. When reviewing Table 1, it should be taken into account that its values are valid for the springs with minimal stress concentrations, which relates both to shearing (for coil helical cylinder springs) and bending (for flat rectangular and triangular springs) stresses. Low stress concentrations are only possible with coil helical cylinder springs having a relatively small diameter of wire (d<3 mm) and with flat springs at low thickness materials (h<1 mm) and, in both cases, for relatively low spring forces. Higher values of d or h will reduce the performance of the spring material internal layers, resulting in stress concentrations in outer layers and larger spring mass. Therefore, high Kd heavy-duty low-inertia power springs can only be made as composite (cassette-type) springs having a relatively large number (e.g., several dozens) of parallel-connected basic elements.

Production of a suitable cassette-type low-inertia power spring is based on the following considerations:
1. Load F is normally applied to the spring on a straight line, and this line never moves from its initial position during working travel of the spring.
2. Effort is normally transmitted to the spring by a sort of rod traveling along its longitudinal axis.
3. It is highly preferable that the drive rod be free from radial stresses, which might cause its blocking, during spring operation.

Figure 13A:
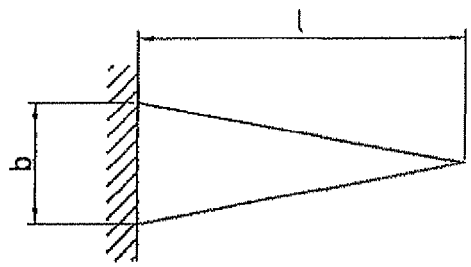
FIGS. 13a and 13b show a detail of a spring arrangement used in the contact spring module.
Figure 13B:
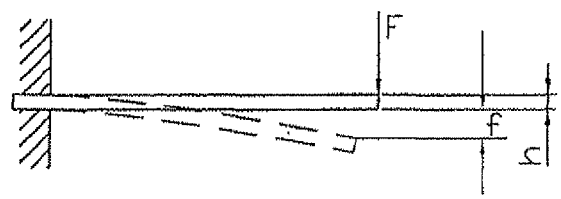
Figure 14:
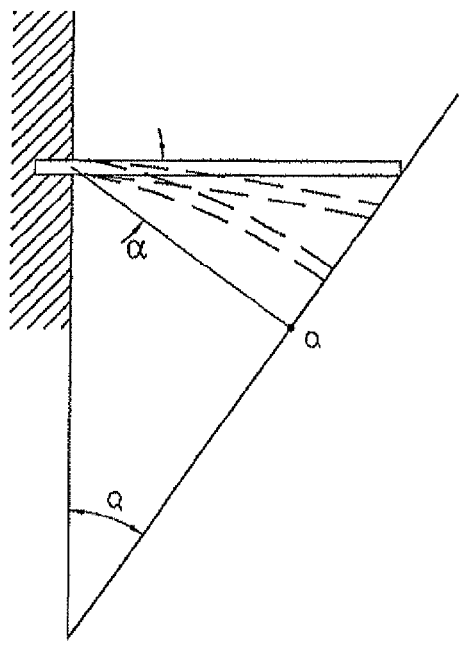
FIG. 14 shows schematically operation of the flat triangular springs shown in FIG. 13.

Moreover, a special feature of flat triangular springs as shown in FIGS. 13a and 13b must be taken into account, namely that at any spring deflection f, its free end moves to a critical point "a", such that a line joining the spring fixing point and the point "a" lies at an angle a to the horizontal to within ≦5% deviation as seen in FIG. 14, α being a function of geometrical parameters of the spring and f value. Such springs are suitable for use in both a current-limiting circuit breaker and a synchronous switch.

Figure 15A:
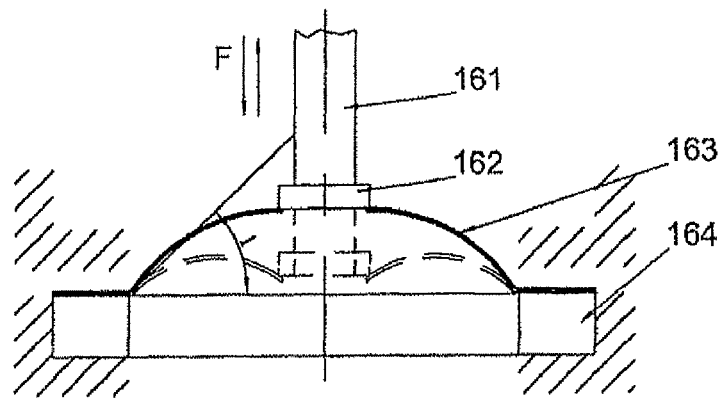
FIGS. 15a and 15b show schematically a cassette-type low-inertia power spring, according to an embodiment of the invention.
Figure 15B:
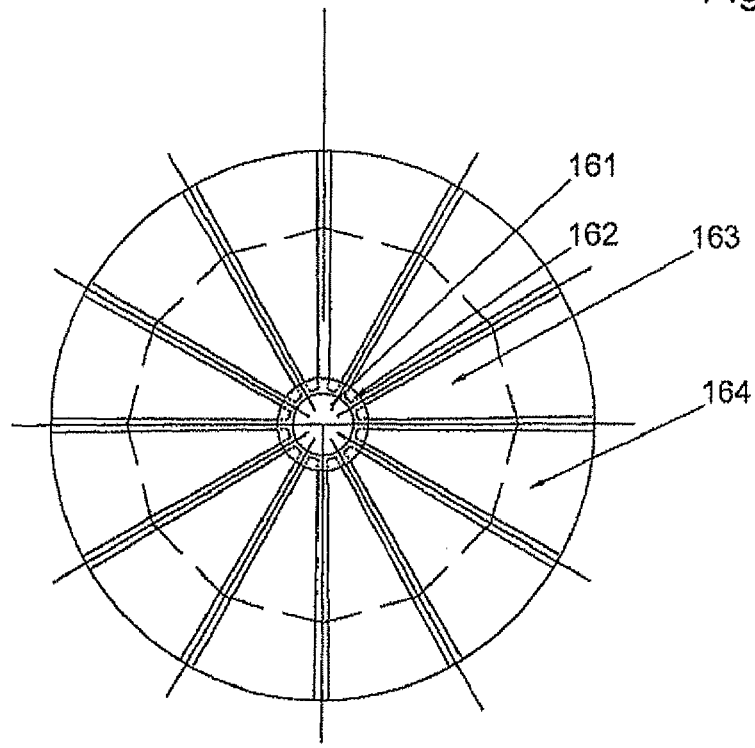

These considerations are met with a cassette-type low-inertia power spring such as shown in FIGS. 15a and 15b including a rod 161 adapted for movement along a vertical axis. A contact spacer 162 directly contacts respective corner apices of a series of triangular leaf springs 163 that, in plan view as shown in FIG. 15b, are arranged as mutually proximate sectors of a circle. An annular cassette 164 supports the respective edges of the triangular leaf springs 163 opposite the apices at a base thereof, such that the respective edge of each leaf spring 163 is attached to an inner circumference of the cassette.

When unloaded, a tangent to the line of attachment of the leaf springs to the cassette 164 subtends an angle α to the vertical. While bending under load, they must not cross into the plane of the cassette. In this case, the corners apices of the leaf springs are displaced almost parallel to the axis of the rod 161, which ensures no radial stress on the rod. To promote this goal the leaf springs 163 are arranged around the rod equally. If necessary, several triangular leaf springs may be superimposed one on top of the other to increase the spring force, F.

The Latch 49 of the Switching Mechanism

As explained above, the latch 49 fixes the switch in the open position and is another important feature of the fast acting switching mechanism 15. The latch is suitable for use in both a current-limiting circuit breaker and a synchronous switch and meets the following basic requirements:
1. Reliable latching (locking) of the drive whenever the switch is in the open position while withstanding stresses of up to dozens of kN.
2. When the switch opens, the latch fixes the movable parts of the switching mechanism 15 at a maximum contact clearance, when the movable part of the switching mechanism 15 comes to rest.
3. The drive module 47 remains fixed indefinitely with no energy input.
4. In response to a 'close' command, the latch is released so as to allow the circuit breaker to be closed.
5. The mass of the parts that are moving when the switch is opened should be minimal.

Requirement 2 follows from current pulse fluctuations triggering the drive module owing to inevitable fluctuations in grid voltage during normal working conditions, which necessarily result in fluctuations of the switch drive working stroke and, consequently, variable contact clearance. To ensure a reliable switch operation, contact clearance should be as large as possible. In the present scheme, such clearance will be equal to the clearance when the movable part of the switching mechanism 15 comes to rest.

In order to comply with the above requirements, a jamming-based latch is employed as shown in FIGS. 16a and 16b and includes an arm 171 of rectangular cross-section attached to the drive rod 44 (shown in FIG. 3) and a pair of rollers 172 each disposed on a respective side of the arm 171 and adapted to rotate about respective pivots 173. A housing 174 of the latch has a tapered inner wall surface whose cross-section is narrowest at an upper portion of the housing. The tapered inner wall surface engages a respective one of the rollers, whose pivots 173 are supported in elongated apertures of a bracket 175 so as to allow limited horizontal displacement of the rollers 172 within the bracket. The bracket 175 is articulated to the housing via a first pin 176 mounted in an oversized aperture and by a second pin 177 mounted in an elongated aperture that allows limited vertical displacement of the bracket. 175 relative to the housing 174. The bracket 175 is fixed at a lower end thereof to an anchor plate 178 that may be pulled down by the closing electromagnet in the drive module 47 and which returns to its normal position (shown in FIG. 16*a*) under the action of springs attached to both sides of the anchor plate. A pair of resilient leaf springs 179 attached to a rim of the housing on opposite sides thereof each engages a corresponding peripheral recess in the bracket 175 on opposite sides thereof, which is therefore capable of limited vertical movement within the housing 174 owing to its being articulated thereto via the elongated aperture.

The latch 49 operates as follows. Since the housing 174 can be rotated about the axis 176, it is self-centered relative to the arm 171 and the drive rod 44. Likewise, since the apertures by means of which the rollers 172 are attached to the bracket 175 are elongated, the rollers 172 are self-aligned within the apertures relative to the arm 171 and the housing 174. When the switch is open, the drive rod 44 and attached arm 171 are disposed in the position shown in FIG. 16*a*, so that the contact bridge 42 that is mounted on the upper end of the drive rod 44 is clear of the fixed contacts 41. FIG. 16*a* also shows the disposition of the electromagnetic drive module in its inactive state either when the switch is open or after it is closed. In all of these cases there is no air gap between the rectangular arm 171, the rollers 172 and the housing 174 so that the arm 171 is gripped tight by the internal wall surfaces of the housing 174 via the rollers 172 thus latching the drive rod 44 into the open position. The present invention is primarily concerned with how the switch is opened under a fault condition and therefore no description has been offered relating to closure of the switch, which must also be done quickly to prevent arcing. When the switch is closed, current is fed to the electromagnetic drive thus pulling the anchor plate 178 down against the restraining force of the springs and bringing with it the bracket 175 and the rollers 172. Since the aperture 177 by means of which the bracket 175 is attached to the housing 174 is slotted, the bracket 175 is able to move downward slightly even though the housing 174 does not move. As a result of the oblique inner surface of the housing, the downward movement of the rollers 172 causes them to be horizontally aligned with a wider cross-section of the inner wall thus allowing slight horizontal displacement of the rollers 172, since they are mounted on the bracket via slotted apertures. This displacement frees the arm 171, thus allowing it to be pushed up by the closing mechanism until it reaches the position shown in FIG. 16*b*. At this point, current is no longer applied to the electromagnet drive, the anchor plate 178 is therefore free to rise under the restraining action of the springs, the bracket rises and the rollers re-align with the narrower internal portion of the inner wall, thus again latching the drive rod, this time in the upper position.

When the switch is now opened, the drive rod 44 is pushed down forcibly thus exerting a downward force on the rollers, which causes the bracket 175 also to move down against slight resilient deformation of the leaf springs 179. As a result, the rollers 172 also move down, thus momentarily releasing the tight grip applied to the drive rod 44 so that the arm 171 attached to the lower end of the drive rod 44 is now free to travel downward into the position shown in FIG. 16*a*. When the switch opening stroke is completed, the drive rod 44 and arm 171 come momentarily to rest after which the drive rod 44 starts moving back towards the fixed contacts 41 at a counter force reaching thousands of Newton. Again, current to the electromagnet drive is now interrupted, allowing the anchor plate 178 to rise under the restraining action of the springs. The bracket now rises and the rollers re-align with the narrower internal portion of the inner wall, thus again latching the drive rod this time in the lower position. As a result, the movable parts of the drive module 47 come to a final rest position where maximum contact clearance may be achieved. The larger the counter force of the drive rod 44, the more reliable is the fixation.

High-Voltage Bypass Circuit (HVBC)

Existing bypass circuits are among the basic components of current limiting high-voltage AC and DC switches. The bypass circuit shunts the main contacts of a circuit breaker and ensures basically arc-less opening of the main contacts owing to current transmission from the main contact circuit to the bypass circuit, and subsequent interruption of load current and short-circuit current.

Figure 17:
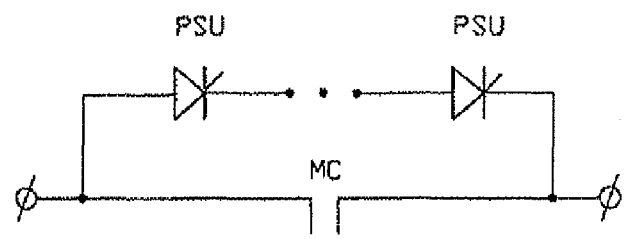
FIG. 17 shows a known DC bypass circuit that may be used by a circuit breaker according to the invention.
Figure 18:
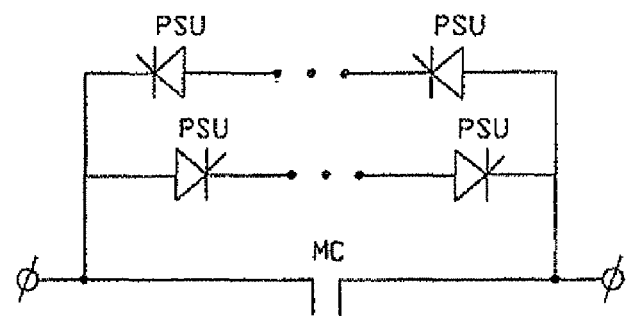
FIGS. 18 and 19 show known AC bypass circuits.
Figure 19:
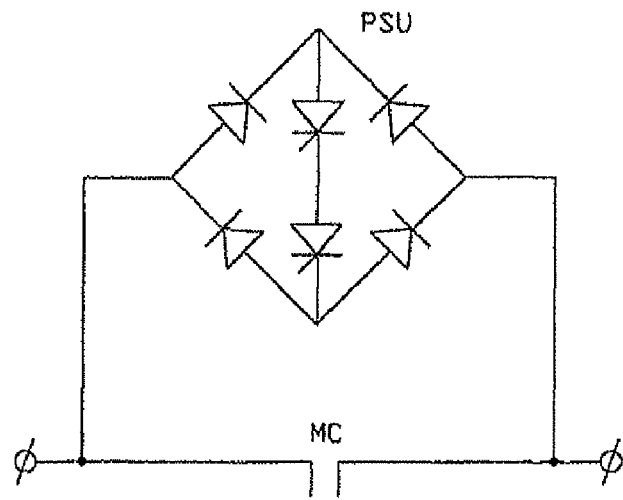

FIG. 17 shows a known DC bypass circuit and FIGS. 18 and 19 show known AC bypass circuits that may be used by a circuit breaker according to the invention, and which normally contain serially connected power semiconductors (PSU), such as gate turn-off thyristors (GTO) or high-voltage thyristors, which can be blocked anyway.

When the main circuit breaker contacts are open, the current flowing in these circuits over long-term operation of the switch is transmitted to the bypass circuit owing to voltage Va of the electric arc created between the contacts. Current will be only transferred to the bypass circuit from the contact circuit, if Va is higher than the total voltage drop ($\Delta U_\Sigma$) in all serially connected semiconductors in the bypass circuit.

The condition for operation of the bypass circuit is therefore:

$$Va > \Delta V_\Sigma \quad (1), \text{ whereby,}$$

$$\Delta V_\Sigma = \Delta V * n \quad (2),$$

where:

$\Delta V$ is forward drop in one semiconductor; and n is the number of serially connected semiconductors.

To ensure a reliable contact circuit, current transfer from the main contacts circuit to the bypass circuit at the required rate (di/dt), the arc voltage Va should be at least 30%-40% higher than the total voltage drop in the bypass circuit. In other words:

$$Va = \text{Const } \Delta V * n, \text{ where Const is in the range of about } 1.3 \text{ to } 1.4 \quad (3).$$

In known contact systems, the voltage drop in the short arc between opening contacts basically depends on near-the-electrode (anode and cathode) voltage drops. Near-the-electrode voltage drops in state-of-the-art contact materials are about 20 V, i.e., in single arc gap systems Va~20V. In bridge-type contact systems, Va~2*20=40V. The forward drop in existing semiconductors, especially in a pulse operation mode as normally used in bypass circuits, is normally 2.5-3V, i.e., $\Delta V$=2.5-3V.

Therefore, in view of equation (3), the number of serially connected semi-conductors that shunt a single gap contact system (e.g., an industrial contact chamber) may not exceed:

$$n = 20/(1.3 \ldots 1.4) \Delta V = 20/(1.3 \ldots 1.4) (2.5 \ldots 3) = 5 \ldots 6$$

Known semiconductors should be designed to withstand an approximately two-fold rated voltage. This means that semiconductors having a nominal voltage rating, Vn, of 10 kV should withstand ~20 kV. Accordingly, in the bypass circuits subjected to the arc voltage, Va each of the PSUs should be designed to Vn psu=1.3*20/(5 ... 6)=4.3 ... 5.2 kV, allowing for a non-uniform voltage distribution, where the term (5 . . . 6) designates the number of series-connected PSUs. In other words, if there are five PSUs connected in series, then the nominal rating of each PSU should be 5.2 kV; while if there are six PSUs connected in series, then the nominal rating of each PSU should be 4.3 kV. Such semiconductors are generally available, and do not present a problem. By simple proportion it follows that networks rated at Vn=24 kV, would require that each PSU in the bypass circuits be rated at Vn≈9 . . . 10 kV and networks rated at Vn=35 kV require that each PSU have a rated voltage Vn of approximately 14 . . . 17 kV. Such PSUs are not currently available, and therefore developing an over-voltage high-voltage current limiting switch rated at Vn=15 . . . 35 kV with vacuum and gas-filled chambers serving as a long-term current carrying medium, and using available bypass circuits containing PSUs as a shunting element, is a significant problem.

According to the invention, there is provided a high-voltage bypass circuit comprising high-voltage shunting elements (PSU) for which Vn>10 kV. The high-voltage bypass circuit applies a compensating voltage of such direction, value and duration to ensure that the shunting circuit transfers at a required rate (di/dt) to facilitate fast arc quenching between the contacts. The arc current is shunted through the bypass circuit at the required rate (di/dt) by providing adequate compensation for the aggregate forward drop ($\Delta V_\Sigma$). Compensating voltage can be larger, smaller or nearly equal to $\Delta V_\Sigma$, all depending on specific high-voltage device parameters, i.e.:

$$Vc > \Delta V_\Sigma,$$

$$Vc < \Delta V_\Sigma,$$

$$Vc \sim \Delta V_\Sigma.$$

Figure 20:
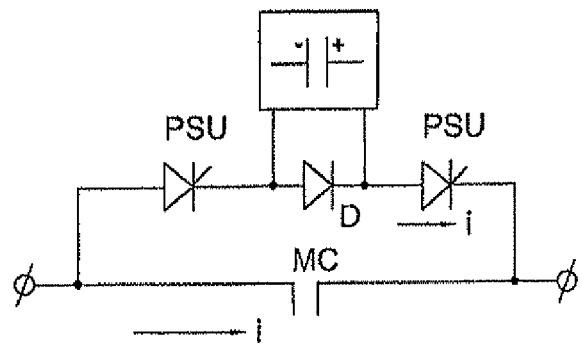
FIGS. 20 to 26 show high-voltage bypass circuits (HVBC) according to various embodiments of the invention.

The shunting arc voltage Va will therefore suffice to transfer the current at the required rate (di/dt). A pulse power source (IS) that normally contains a storage condenser, control units, and capacitor chargers can serve as the voltage source. The high-voltage bypass circuit can be designed depending on the specific type and model of high-voltage device. FIG. 20 shows a DC high-voltage bypass circuit having a pulse source directly connected to the high-voltage bypass circuit, where:

PSU—are power semiconductors;
D—is a low-voltage reference diode;
IS—is a pulse power source;
MC—are shunting circuit main contacts.

FIGS. 20 to 26 show high-voltage bypass circuits according to various embodiments of the invention for use with a current-limiting circuit breaker and which operate as follows. In all circuit identical symbols are used to refer to components that are either identical or perform equivalent functions. Once the main contacts MC are opened, the pulse power source IS activates to apply compensating voltage across the diode D of such direction, value and duration, to ensure that arc current transfers through the bypass circuit at a rate (di/dt) dictated by the circuit-breaker rating. The pulse power source can be activated either by triggering a bypass semiconductors circuit, or using a standby switch.

Figure 21:
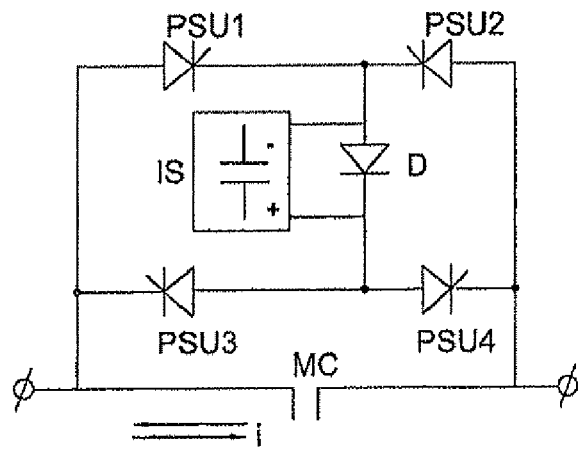

FIG. 21 shows an AC high-voltage bypass circuit with the pulse power source directly connected to the high-voltage bypass circuit. The same reference symbols are used as in FIG. 20. It operates as follows. PSU 1-PSU 4 or PSU 2-PSU 3 are triggered depending on the polarity of the breaking current i flowing through the main contacts. Subsequent operation of the device is like that shown in FIG. 20.

In both of the above high-voltage bypass circuits the pulse power source (IS) is connected across the diode D of the high-voltage bypass circuit and is this connected directly to the high-voltage bypass circuit. However, it may also be connected indirectly such as via transformer coupling.

Figure 22:
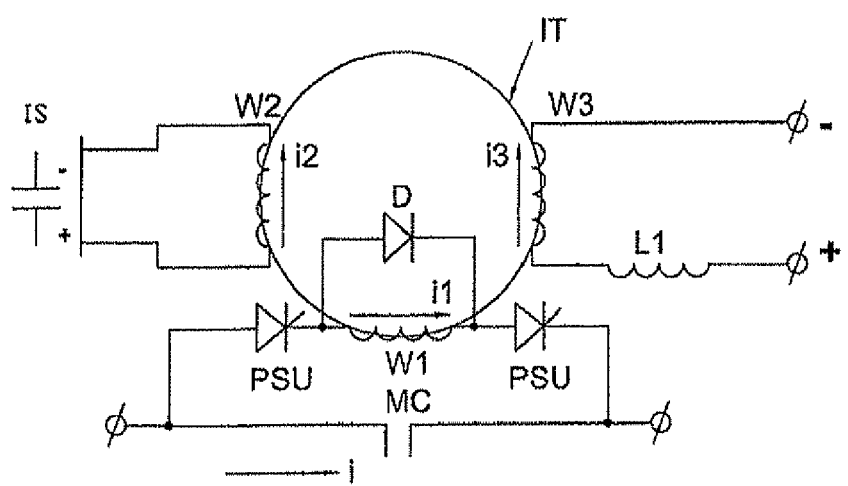

FIG. 22 shows such a DC high-voltage bypass circuit where the pulse source is connected by means of a pulse transformer, where:

PSU—are power semiconductors;
IT—is a Pulse Transformer;
D—is a low-voltage reference diode;
IS—is a pulse power source;
W1—is a VBC-connected IT winding;
W2—is an IS-connected IT winding;
W3—is a bias winding;
L1—is a bias winding boost inductance; and
MC—are shunting circuit main contacts.

The device operates as follows. Once the main contacts MC are opened, the pulse power source is discharged through winding W2 carrying a current i2. The turns ratio of the windings W1:W2 ensures that sufficient compensating voltage Vc is generated across the winding W1 as required for the current-limiting high-voltage circuit breaker. The magnetic resistance reversal of the pulse transformer is deliberately set longer than the time required to transfer the current from the main contacts of the shunting circuit to the bypass circuit. A bias winding W3 carrying a current i3 is. required to revert the pulse transformer to the initial magnetic state after actuation. The bias winding W3 boosts the inductance which is required to reduce the current i3 during operation of the pulse power source. Judicious selection of the ratio of W1/W2 and the corresponding value of Vc required, ensures that current is transferred from the main contacts to the bypass circuit for any value of n (i.e., the number of serially connected semiconductors in the bypass circuit).

Figure 24:
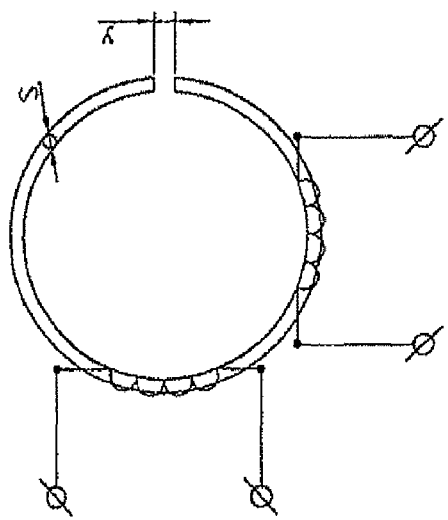
Figure 23:
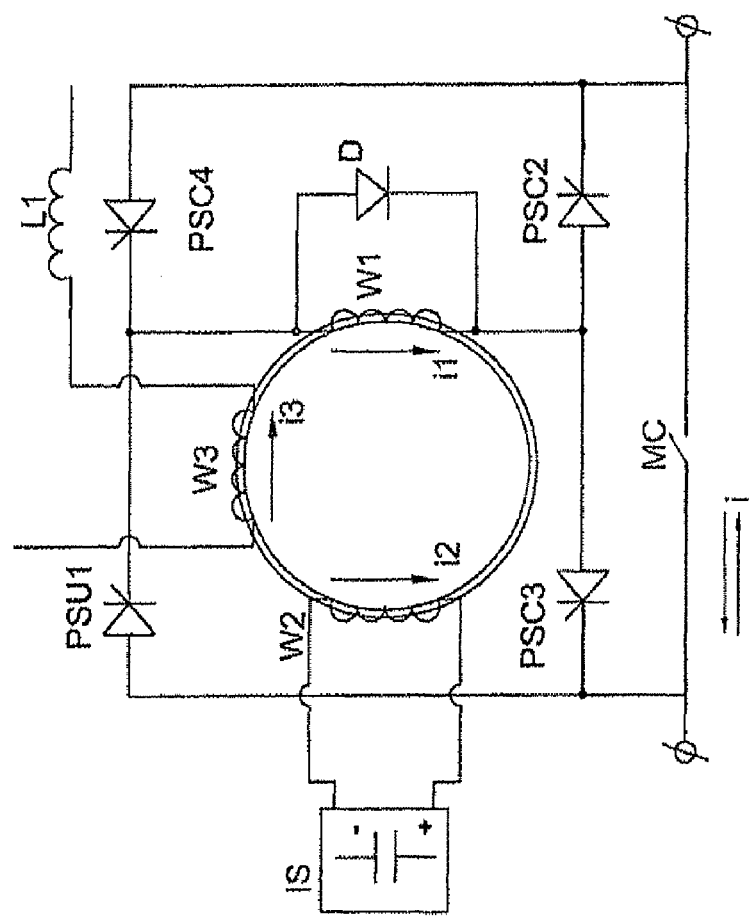

FIG. 23 shows an AC high-voltage bypass circuit having a pulse source connected by means of a pulse transformer and which operates as follows. PSU 1-PSU 2 or PSU 4-PSU 3 are triggered depending on the polarity of the breaking current i flowing through main contacts. Thereafter, the device operates like that shown in FIG. 22. In certain schemes of pulse transformer, the bias winding may be disconnected. In this case, the pulse transformer iron will resume its initial magnetic state after actuation of the pulse transformer by introducing an air gap δ in the iron (FIG. 24). The air gap provides a two-fold increase in the product of the inductance of the pulse transformer coils multiplied by the core cross-section, and slightly increases IS power, while simplifying the scheme and making it more reliable.

Figure 26:
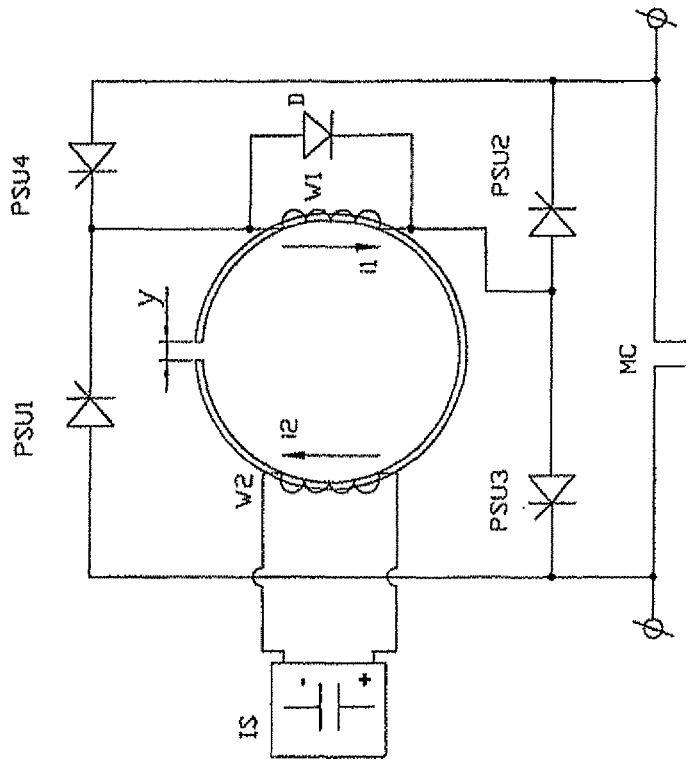
Figure 25:
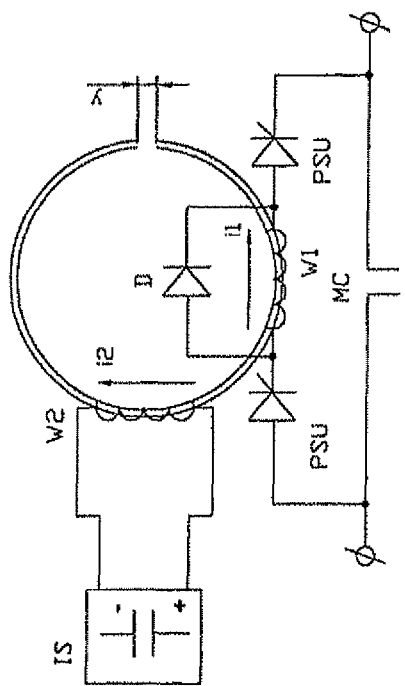

DC and AC bypass circuits with air gap (clearance) pulse transformers are shown in FIGS. 25 and 26 using the same reference symbols as in FIG. 22, 24). The only difference from the circuit shown in FIGS. 22 and 24 is that the iron of the pulse transformer resumes its initial magnetic state by introducing an air gap (clearance) δ (FIG. 24) rather than using bias winding W3.

To increase the speed of current transfer from the main circuit to the bypass circuit, a toroidal transformer a coil wound along its complete circumference may be used as pulse transformer so as to have minimal self-inductance.

The proposed high-voltage bypass circuit therefore ensures current transfer from the main circuit to the bypass circuit at the required rate, while ensuring that the shunting arc voltage does not exceed an aggregate forward drop in the PSUs. This allows development of a high-voltage current limiting switch that withstands higher nominal voltage Vn than known configurations employing a single shunting arc voltage, which is not enough to provide current transfer at the required rate.

It thus emerges that distinctive features of the proposed high-voltage bypass circuit are as follows:

1. Bypass circuit uses a compensating boost voltage of such direction, value and duration, which ensures current transfer from the shunting circuit at the required rate by means of an adequate compensation for the aggregate forward drop. When the main contact opens, breaking current is transmitted to the bypass circuit (regardless of the breaking current direction).
2. High-voltage bypass circuit as in para. 1, where a storage condenser serves as a pulse source of compensating device.
3. DC and AC high-voltage bypass circuit as in paras. 1 and 2, where the pulse source of the compensating device is directly connected to high-voltage bypass circuit by means of pulsing transformer.
4. DC and AC high-voltage bypass circuit as in paras. 1, 2, and 3, where the pulse source of the compensating device is connected to the high-voltage bypass circuit by means of a bias winding pulsing transformer.
5. DC and AC high-voltage bypass circuit as per paras. 1 to 4, where the pulse transformer has no bias winding and has an air gap in its iron core.

Hermetic Casing for a Current Limiting Switch

State-of-the-art casings for medium voltage electric switches with output power terminals can be formed of stainless steel or plastic materials. The output terminals of a stainless steel case pass through the walls of the casing via insulating bushings.

Output terminals for a casing formed of plastic materials pass through side flanges fixed to the casing using special type screw thread and glue, usually made of epoxy resin. So, output power terminals have to be made from material, with coefficient of volumetric expansion close to that of epoxy resin (e.g., aluminum), that leads to more expensive and complex assembly of the casing.

Furthermore, setting output power terminals inside the casing demands special fixing devices (when the casing is manufactured from plastic) or base insulators (for a casing manufactured from stainless steel). All this leads to more expensive and complex assembly of the casing and increases the price of the switch itself.

Figure 27:
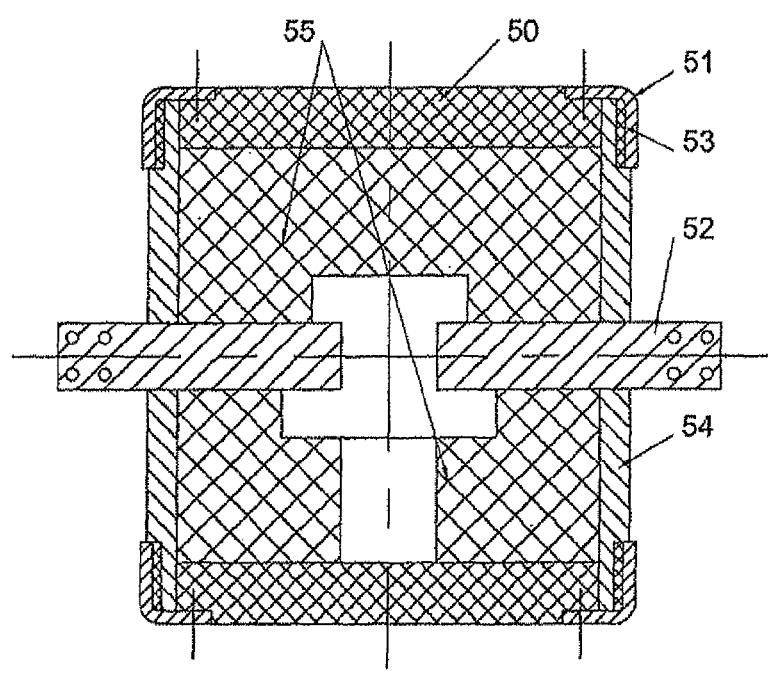
FIG. 27 shows an insulation media arc quenching casing for the medium-voltage circuit-breaker, according to an embodiment of the invention.

Referring to FIG. 27, a casing and output power terminals assembly, are shown according to an embodiment of the invention resulting in a simpler apparatus of reduced price. The casing is suitable for use in both a current-limiting circuit breaker and a synchronous switch. The casing includes a cylindrical capsule 50 formed of plastic having circular fixing brackets 51 that may be steel. The number of fixing bolts used in the casing depends on the gas pressure inside the casing. The brackets 51 and output power terminals 52 are assembled by using assembling bolts through rubber gaskets 53 and terminals flanges 54.

The terminals flanges 54 are soldered to the terminals 52 without any gap, to achieve high hermetic sealing. Power terminals can be manufactured from any high conductive material (e.g. copper), while flanges should be robust (e.g. made from brass). Foucault (eddy) currents generated by AC currents flowing through the power terminals 52 give rises to negligible overheating. For example, tests carried out by the inventors with switch's power terminals set to a rated current of Ir=2500A show a temperature rise given by $\Delta T=1.5°$ C.

When the switching mechanism 15 is installed inside such a hermetic casing, mechanical shock withstand requirements can be achieved by gluing using e.g. epoxy resin the terminals 52 to the cylindrical capsule 50, by using two half cylinders 55, to hold and align the terminals 52. While the length of the capsule 50 depends on insulation considerations between the main terminals, its radius can be reduced by using the bottom part of a T-type capsule to contain the switching mechanism.

The switching mechanism can be external to the casing with a reduced radius of the capsule 50 by using bellows (a cylindrical membrane) attached between the drive rod 44 and the hermetic capsule 50. The hermetic insulated case is filled with $SF_6$ gas at a pressure of up to 8 Atm. for a medium-voltage electric switch, with power output terminals. This allows the switching mechanism to be external to the contact chamber containing the $SF_6$ gas and to be articulated to the contacts in such manner as to allow for the to and fro motion of the drive module. Alternatively, the breaker gas may be any other suitably inert gas such as nitrogen or oxygen.

Gas fittings (not shown) and electric wall terminals (not shown) can be inserted before the casting process of the capsule 50 or assembled later by boring and using rubber or appropriate O-rings and/or gluing, to meet the hermetic capsule's requirements and withstand a gas pressure of up to 8 Atm. The $SF_6$ gas can be filled later through these fittings which will serve also for gas measurements.

The invention claimed is:

1. A fast acting switching mechanism for a circuit breaker, said fast acting switching mechanism comprising:
    a drive rod articulated to a drive module and supporting at an end thereof a contact bridge having at opposite ends thereof respective moveable contacts for switchably engaging a pair of fixed contacts of the circuit breaker;
    a contact spring unit operatively coupled to the drive module configured to apply a closing pressure; and
    a latch configured to latch the drive rod in an open or closed position after operation of the circuit breaker and to prevent rebounds, wherein the contact bridge comprises:
        a pair of side conductors supporting on upper edges thereof an armature having an exposed upper surface that supports said moveable contacts at opposite ends of the armature; and
        a reinforcing element inserted between the side conductors, such that when current flows through the contact bridge, corresponding magnetic fluxes generated by the side elements cancel each other in an area between the side elements, whereby substantially no magnetic flux passes through the reinforcing element.

2. The switching mechanism according to claim 1, wherein the reinforcing element is formed of a magnetic material.

3. The switching mechanism according to claim 1, wherein the drive module comprises an electrodynamic device having a housing adapted for fixedly mounting within the circuit breaker and allowing movement of the drive rod within the housing, said housing accommodating:
    a repulsion coil;
    an actuation coil adapted for engaging the drive rod so that movement of the actuation coil induces movement of the drive rod;
    an acceleration coil adapted for sliding movement on the drive rod;
    a retention device for arresting the acceleration coil;
    a spring for resiliently urging the acceleration coil toward the retention device prior to operation of the switching mechanism;
    a braking coil; and
    a spacer for maintaining a minimal clearance ($\delta 1$) between the actuation coil and the acceleration coil prior to operation of the switching mechanism,
    wherein the switching mechanism being responsive to an opening signal for applying current to the repulsion coil, the actuation coil and to the acceleration coil in such manner as to induce a repulsive force between the repulsion coil and the actuation coil while inducing an attractive force between the actuation coil and the acceleration coil thereby imparting an opening force to the drive rod and moving the drive rod through the speeding clearance ($\delta 1$) until the actuation coil abuts the acceleration coil and thereafter to move the actuation coil and the acceleration coil together through a braking clearance ($\delta 2$) toward the braking coil against the spring for slowing down movement of the drive rod, 4. The switching mechanism according to claim 3, wherein the actuation coil is supported on a pivot ring that is slidably mounted on the drive rod and engages a peripheral ridge of the drive rod.

5. The switching mechanism according to claim 3, wherein the braking clearance ($\delta 2$) is at least twice the speeding clearance ($\delta 1$).

6. The switching mechanism according to claim 1, wherein the contact spring unit comprises a cassette-type low-inertia power spring comprising:
- a rod adapted for movement along a vertical axis;
- an annular cassette that supports respective edges of a series of triangular leaf springs each at a respective base thereof opposite a respective apex thereof, such that the respective edge of each leaf spring is attached to an inner circumference of the cassette; and
- a contact spacer mounted in the rod for contacting respective corner apices of the leaf springs.

7. The switching mechanism according to claim 1, wherein the latch comprises:
- a housing having a tapered inner wall surface whose cross-section is narrowest at an upper portion of the housing;
- an arm adapted to be attached to the drive rod;
- a pair of rollers each disposed on a respective side of the arm and adapted to rotate about respective pivots;
- a bracket having on opposite sides thereof a respective elongated aperture for accommodating said pivots so as to allow limited horizontal displacement of the rollers within the bracket;
- the bracket being articulated to the housing via a first pin mounted in an oversized aperture and by a second pin mounted in an elongated aperture that allows limited vertical displacement of the bracket relative to the housing;
- an anchor plate fixed to a lower end of the bracket and adapted to be pulled down by a closing electromagnet in the drive module against a resilient bias force of springs attached to opposite sides of the anchor plate; and
- a plurality resilient leaf springs attached to a circumferential rim of the housing and adapted to engage the bracket for allowing limited vertical movement of the bracket within the housing.

8. A circuit breaker comprising the switching mechanism according to claim 1, and further comprising a pair of heat pipes formed of thermally conducting closed tubes containing a refrigerant under low pressure and supporting radiation fins.

9. The circuit breaker comprising the switching mechanism according to claim 8, wherein the heat pipes are disposed proximate respective junctions of the fixed contacts and the moveable contacts for conducting heat away from the contacts.

10. The circuit breaker according to claim 9, further comprising a bypass circuit for shunting arc current away from the fixed contacts and the moving contacts during opening of the circuit breaker.

11. The circuit breaker according to claim 10, wherein the high voltage bypass circuit comprises a pulse power source for applying a compensating voltage of such direction, value and duration that ensures that the shunting circuit transfers at a required rate (di/dt) to facilitate fast arc quenching between the contacts.

12. The circuit breaker according to claim 10, further comprising a bank of commuting capacitors for discharging in a counter direction to the flow of the fault current.

13. The circuit breaker according to claim 11, wherein the pulse power source is connected by means of a pulse transformer.

14. The circuit breaker according to claim 13, wherein:
- the pulse transformer has a first winding (W1) and a second winding (W2) having a turns ratio (W1:W2) that ensures that the compensating voltage is generated by the first winding (W1);
- magnetic resistance reversal of the pulse transformer is set longer than the time required to transfer the current from the main contacts of the circuit breaker to the bypass circuit;
- the pulse transformer has a bias winding (W3) carrying a current i3 as required to revert the pulse transformer to the initial magnetic state after actuation; and
- the bias winding (W3) boosts the inductance which is required to reduce the current i3 during operation of the pulse power source.

15. The circuit breaker according to claim 14, wherein the ratio of W1/W2 and the corresponding value of compensating voltage are selected to ensure that current is transferred from the main circuit to the bypass circuit in accordance with the number of serially connected semiconductors in the bypass circuit.

16. The circuit breaker according to claim 13, wherein:
- the pulse transformer has a first winding (W1) and a second winding (W2) having a turns ratio (W1:W2) that ensures that the compensating voltage is generated by the first winding (W1);
- magnetic resistance reversal of the pulse transformer is deliberately set longer than the time required to transfer the current from the main contacts of the circuit breaker to the bypass circuit; and
- the pulse transformer has an air gap for causing the pulse transformer to resume its initial magnetic state after actuation.

17. The circuit breaker according to claim 16, wherein the ratio of W1/W2 and the corresponding value of compensating voltage are selected to ensure that current is transferred from the main circuit to the bypass circuit in accordance with the number of serially connected semiconductors in the bypass circuit.

18. The circuit breaker according to claim 9, wherein the fixed and moveable contacts are disposed within a hermetic casing containing a breaker medium.

19. The circuit breaker according to claim 18, wherein the hermetic casing comprises a cylindrical capsule formed of plastic having circular fixing brackets formed of steel for coupling the line voltage thereto.

20. The circuit breaker according to claim 18, wherein the breaker medium is an inert gas.

21. The circuit breaker according to claim 20, wherein the inert gas is one or more of the following or a combination thereof: dry air; $SF_6$; and nitrogen.

22. The switching mechanism according to claim 21, wherein the closing pressure in an order of 200 kilograms.

23. A circuit breaker comprising the switching mechanism according to claim 1, wherein the closing pressure in an order of 200 kilograms.

* * * * *